(12) United States Patent
Kim et al.

(10) Patent No.: US 11,156,800 B2
(45) Date of Patent: Oct. 26, 2021

(54) CAMERA MODULE

(71) Applicant: SAMSUNG ELECTRO-MECHANICS CO., LTD., Suwon-si (KR)

(72) Inventors: Myeung Su Kim, Suwon-si (KR); Sung Man Pang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 215 days.

(21) Appl. No.: 16/351,942

(22) Filed: Mar. 13, 2019

(65) Prior Publication Data

US 2020/0018922 A1 Jan. 16, 2020

(30) Foreign Application Priority Data

Jul. 10, 2018 (KR) .................. 10-2018-0080214

(51) Int. Cl.
| | |
|---|---|
| *G02B 7/09* | (2021.01) |
| *G02B 27/64* | (2006.01) |
| *G03B 5/00* | (2021.01) |
| *H02K 41/035* | (2006.01) |
| *G03B 13/36* | (2021.01) |

(52) U.S. Cl.
CPC .............. *G02B 7/09* (2013.01); *G02B 27/646* (2013.01); *G03B 5/00* (2013.01); *G03B 13/36* (2013.01); *H02K 41/0354* (2013.01); *G03B 2205/0007* (2013.01); *G03B 2205/0069* (2013.01)

(58) Field of Classification Search
CPC .......... G02B 7/09; G02B 27/646; G03B 5/00; G03B 13/36; H02K 41/0354
USPC ........................................................ 359/823
See application file for complete search history.

(56) References Cited

U.S. PATENT DOCUMENTS

| 4,348,645 A | 9/1982 | Ushida et al. |
| 9,661,198 B2 | 5/2017 | Macours et al. |
| 2013/0169857 A1* | 7/2013 | Christo .............. H04N 5/23212 348/349 |

(Continued)

FOREIGN PATENT DOCUMENTS

| JP | H10-246853 A | 9/1998 |
| JP | 2001021306 A * | 1/2001 |

(Continued)

OTHER PUBLICATIONS

Korean Office Action dated Oct. 15, 2019 in corresponding Korean Patent Application No. 10-2018-0080214 (9 pages in English, 6 pages in Korean).

*Primary Examiner* — James R Greece
(74) *Attorney, Agent, or Firm* — NSIP Law

(57) ABSTRACT

A camera module includes a lens barrel, a driving coil disposed to face a target detection unit disposed on one side of the lens barrel, a driving device to provide a driving signal to the driving coil, and a position calculating unit including a capacitor, constituting an oscillation circuit together with the driving coil, to calculate a position of the lens barrel from an oscillation signal output by the oscillation circuit. The position calculating unit generates an alternating current (AC) signal according to a comparison result of a peak of the oscillation signal and a reference peak and calculates a position of the lens barrel according to a frequency of the AC signal.

16 Claims, 12 Drawing Sheets

(56) References Cited

U.S. PATENT DOCUMENTS

| | | | |
|---|---|---|---|
| 2016/0134796 A1* | 5/2016 | Kaneko | G03B 43/00 |
| | | | 348/208.11 |
| 2017/0228049 A1* | 8/2017 | Yamamoto | G06F 3/046 |
| 2017/0285772 A1* | 10/2017 | Yamamoto | G06F 3/046 |
| 2018/0074283 A1 | 3/2018 | Ko et al. | |
| 2018/0146130 A1 | 5/2018 | Lee et al. | |

FOREIGN PATENT DOCUMENTS

| | | | |
|---|---|---|---|
| JP | 2004069415 A | * | 3/2004 |
| JP | 2008-048217 A | | 2/2008 |
| KR | 10-1166418 B1 | | 7/2012 |
| KR | 10-2013-0077216 A | | 7/2013 |
| KR | 10-2018-0029479 A | | 3/2018 |
| KR | 10-2018-0057488 A | | 5/2018 |

\* cited by examiner

CAMERA MODULE

CROSS-REFERENCE TO RELATED APPLICATION

This application claims the benefit under 35 USC 119(a) of Korean Patent Application No. 10-2018-0080214 filed on Jul. 10, 2018 in the Korean Intellectual Property Office, the entire disclosure of which is incorporated herein by reference for all purposes.

BACKGROUND

1. Field

The following description relates to a camera module.

2. Description of Background

Portable communications terminals such as cellular phones, personal digital assistants (PDAs), portable personal computers (PCs), or the like, have generally been implemented with the ability to perform the transmission of video data as well as the transmission of text or audio data. In accordance with such a trend, camera modules have been standardly installed in portable communications terminals in order to enable the transmission of the video data, video chatting, and the like.

Generally, a camera module includes a lens barrel having lenses disposed therein, a housing accommodating the lens barrel therein, and an image sensor converting an image of a subject into an electrical signal. A single focus type camera module capturing an image of a subject with a fixed focus may be used as the camera module. However, in accordance with technological development, a camera module including an actuator enabling autofocusing (AF) has been used. In addition, such a camera module may include an actuator for an optical image stabilization (OIS) function to suppress a resolution decrease phenomenon due to hand-shake.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens barrel, a driving coil disposed to face a target detection unit disposed on one side of the lens barrel, a driving device to provide a driving signal to the driving coil, and a position calculating unit including a capacitor, constituting an oscillation circuit together with the driving coil, to calculate a position of the lens barrel from an oscillation signal output by the oscillation circuit. The position calculating unit generates an alternating current (AC) signal according to a comparison result of a peak of the oscillation signal and a reference peak and calculates a position of the lens barrel according to a frequency of the AC signal.

The position calculating unit may include a peak detecting unit to detect the peak of the oscillation signal and a comparing unit configured to compare the peak of the oscillation signal with the reference peak.

The position calculating unit may include an oscillator to output the AC signal according to a comparison result of the comparing unit.

The oscillator may include a voltage controlled oscillator to generate the AC signal according to the comparison result provided in the form of a voltage.

The position calculating unit may include an oscillation maintaining unit to amplify the oscillation signal to maintain oscillation of the oscillation circuit.

The position calculating unit may include a gain control unit to control an amplification gain of the oscillation maintaining unit according to the comparison result of the comparing unit.

The gain control unit may control the amplification gain of the oscillation maintaining unit such that the peak of the oscillation signal is maintained at a predetermined level.

The gain control unit may control the amplification gain of the oscillation maintaining unit such that the peak of the oscillation signal follows the reference peak.

The capacitor, constituting the oscillation circuit together with driving coil, may be disposed between a tab terminal of the driving coil and a ground.

The position calculating unit may include capacitor to provide a ground for the AC signal to the driving coil.

In another general aspect, a camera module includes a lens barrel; a driving coil disposed to face a target detection unit disposed on one side of the lens barrel; a driving device to provide a driving signal to the driving coil; and a position calculating unit including a capacitor, constituting an oscillation circuit together with the driving coil, to calculate a position of the lens barrel from an oscillation signal output by the oscillation circuit. The position calculating unit compares a phase of the oscillation signal with a phase of a reference clock to generate an alternating current (AC) signal and calculates a position of the lens barrel according to a frequency of the AC signal.

The position calculating unit may include a phase detecting unit to detect the phase of the oscillation signal to output a pulse signal corresponding to the phase of the oscillation signal; and a comparing unit to compare the pulse signal with the reference clock.

The position calculating unit may output the AC signal according to a phase difference signal output by the comparing unit.

The oscillator may include a voltage controlled oscillator to generate the AC signal according to the phase difference signal provided in the form of a voltage.

The capacitor, constituting the oscillation circuit together with the driving coil, may be disposed between a tab terminal of the driving coil and a ground.

The position calculation unit may include a capacitor to provide a ground for the AC signal to the driving coil.

The driving device may generate the driving signal based on an input signal applied from an external source and a feedback signal generated from the position calculating unit.

The driving coil may include at least one first driving coil to generate a force to drive the lens barrel in first direction perpendicular to an optical axis direction and at least one second driving coil to generate a force to drive the lens barrel in second direction perpendicular to the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
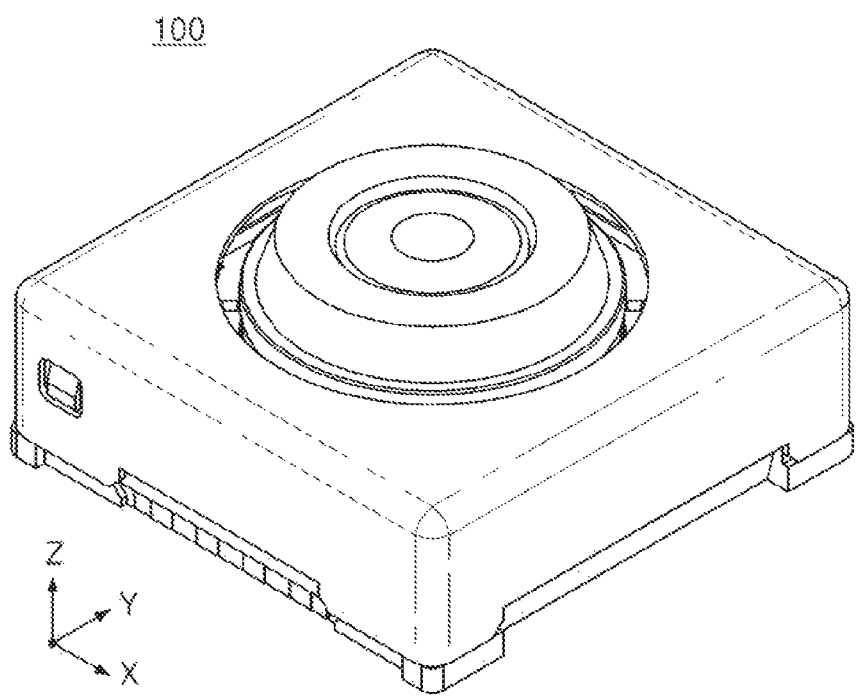
FIG. 1 is a perspective view illustrating a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described with reference to the attached drawings.

Figure 2:
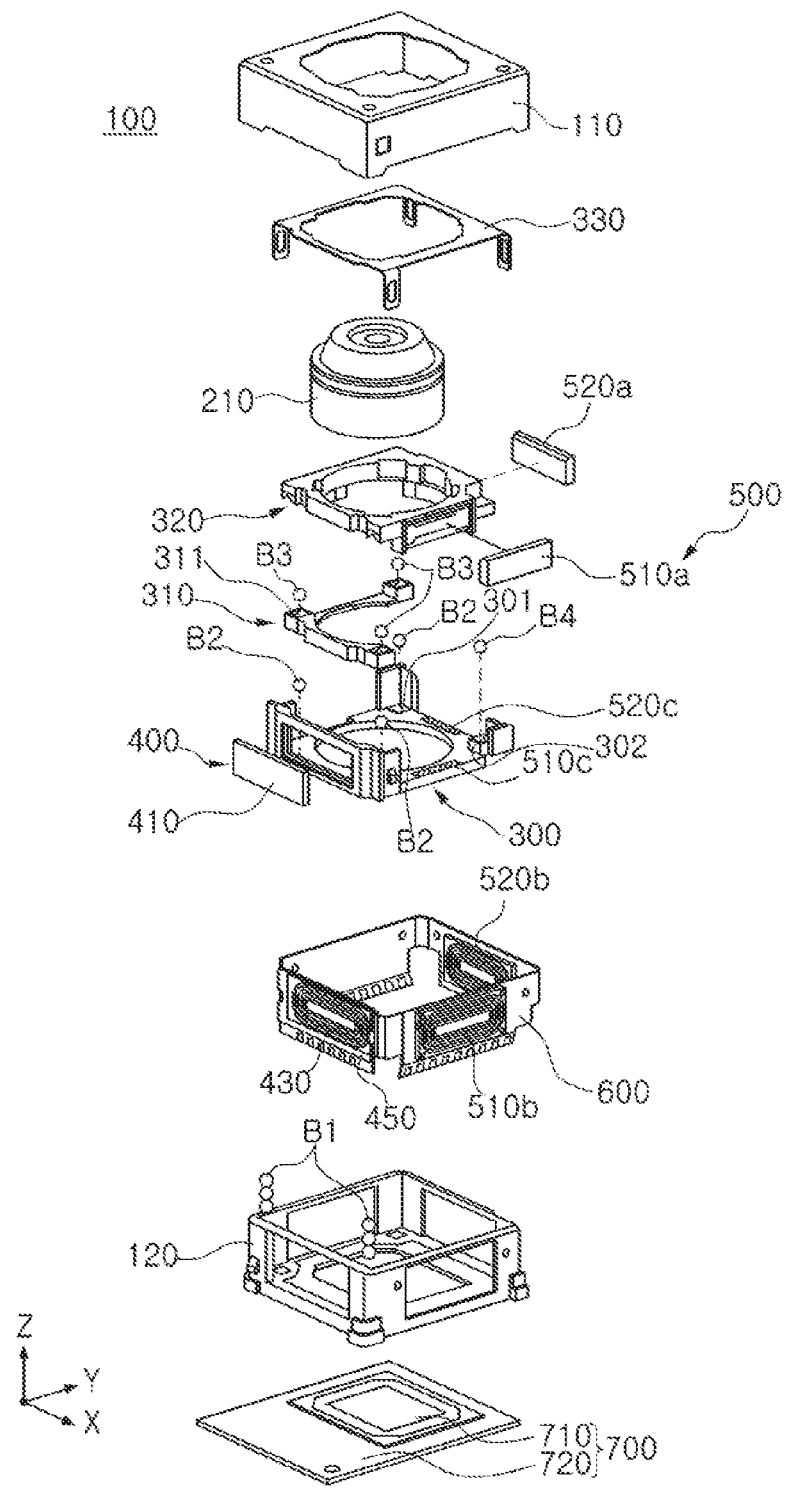
FIG. 2 is a schematic exploded perspective view illustrating a camera module according to an example.

FIG. 1 is a perspective view illustrating a camera module according to an example, and FIG. 2 is a schematic exploded perspective view illustrating a camera module according to an example.

Referring to FIGS. 1 and 2, a camera module 100 may include a lens barrel 210 and an actuator moving the lens barrel 210. The camera module 100 may include a case 110 and a housing 120 accommodating the lens barrel 210 and the actuator therein, and may further include an image sensor module 700 converting light incident thereto through the lens barrel 210 into an electrical signal.

The lens barrel 210 may have a hollow cylindrical shape so that a plurality of lenses capturing an image of a subject may be accommodated therein, and the plurality of lenses may be mounted in the lens barrel 210 along an optical axis. The number of lenses disposed in the lens barrel 210 may depend on a design of the lens barrel 210, and the respective lenses may have optical characteristics such as the same refractive index or different refractive indices, or the like.

The actuator may move the lens barrel 210. As an example, the actuator may move the lens barrel 210 in an optical axis (Z-axis) direction to focus the lenses, and may move the lens barrel 210 in a direction perpendicular to the optical axis (the Z axis) to correct hand-shake at the time of capturing an image. The actuator may include a focusing unit 400 focusing the lenses and a hand-shake correction unit 500 correcting the shake.

The image sensor module 700 may convert the light incident thereto through the lens barrel 210 into the electrical signal. As an example, the image sensor module 700 may include an image sensor 710 and a printed circuit board 720 connected to the image sensor 710, and may further include an infrared filter. The infrared filter may cut off light in an infrared region in the light incident thereto through the lens barrel 210. The image sensor 710 may convert the light incident thereto through the lens barrel 210 into the electrical signal. As an example, the image sensor 710 may include a charge coupled device (CCD) or a complementary metal oxide semiconductor (CMOS). The electrical signal converted by the image sensor 710 may be output as an image through a display unit of a portable electronic device. The image sensor 710 may be fixed to the printed circuit board 720, and may be electrically connected to the printed circuit board 720 by wire bonding.

The lens barrel 210 and the actuator may be accommodated in the housing 120. As an example, the housing 120 may have a shape of which the top and the bottom are opened, and the lens module 210 and the actuator may be accommodated in an internal space of the housing 120. The image sensor module 700 may be disposed on the bottom of the housing 120.

The case 110 may be coupled to the housing 120 to surround external surfaces of the housing 120, and may protect internal components of the camera module 100. The case 110 may shield electromagnetic waves. As an example, the case 110 may shield electromagnetic waves generated from the camera module 100 so that the electromagnetic waves do not have an influence on other electronic components in the portable electronic device.

The actuator may include the focusing unit 400 focusing the lenses and the hand-shake correction unit 500 correcting the shake.

The focusing unit 400 may include a magnet 410 and a driving coil 430 generating driving force to move the lens barrel 210 and a carrier 300 accommodating the lens barrel 210 therein in the optical axis (Z-axis) direction.

The magnet 410 may be mounted on the carrier 300. As an example, the magnet 410 may be mounted on one surface of the carrier 300. The driving coil 430 may be mounted on the housing 120, and may be disposed to face the magnet 410. As an example, the driving coil 430 may be disposed on one surface of a substrate 600, and the substrate 600 may be mounted on the housing 120.

The magnet 410 may be mounted on the carrier 300 to move in the optical axis (Z-axis) direction together with the carrier 300, and the driving coil 430 may be fixed to the housing 120. However, positions of the magnet 410 and the driving coil 430 may be exchanged with each other. When a driving signal is applied to the driving coil 430, the carrier 300 may be moved in the optical axis (Z-axis) direction by electromagnetic interaction between the magnet 410 and the driving coil 430.

Since the lens barrel 210 is accommodated in the carrier 300, the lens barrel 210 may also move in the optical axis (Z-axis) direction by the movement of the carrier 300. Since a frame 310 and a lens holder 320 are accommodated in the carrier 300, the frame 310, the lens holder 320, and the lens barrel 210 may also be moved together in the optical axis (Z-axis) direction by the movement of the carrier 300.

Rolling members B1 may be disposed between the carrier 300 and the housing 120 to reduce a frictional force between the carrier 300 and the housing 120 when the carrier 300 is moved. Each of the rolling members B1 may have a ball shape. The rolling members B1 may be disposed on both sides of the magnet 410.

A yoke 450 may be disposed on the housing 120. As an example, the yoke 450 may be mounted on the substrate 600 and be disposed on the housing 120. The yoke 450 may be provided on the other surface of the substrate 600. Therefore, the yoke 450 may be disposed to face the magnet 410 with the driving coil 430 interposed between the yoke 450 and the magnet 410. An attractive force may act in a direction perpendicular to the optical axis (Z-axis) between the yoke 450 and the magnet 410. Therefore, the rolling members B1 may remain in contact with the carrier 300 and the housing 120 due to the attractive force between the yoke 450 and the magnet 410. The yoke 450 may collect magnetic force of the magnet 410 to prevent generation of leakage flux. As an example, the yoke 450 and the magnet 410 may form a magnetic circuit.

A closed loop control manner of sensing and feeding back a position of the lens barrel 210 may be used in a focusing process. Therefore, a position calculating unit may be provided for closed loop control. The position calculating unit may detect the position of the lens barrel 210.

The hand-shake correction unit 500 may be used to correct image blurring or moving picture shaking due to a factor such as hand-shake of a user at the time of capturing an image or a moving picture. For example, when the hand-shake is generated at the time of capturing the image due to the hand-shake of the user, or the like, the hand-shake correction unit 500 may compensate for the shake by allowing the lens barrel 210 to be relatively displaced to correspond to the shake. As an example, the hand-shake correction unit 500 may move the lens barrel 210 in a direction perpendicular to the optical axis (the Z axis) to correct the hand-shake.

The hand-shake correction unit 500 may include a plurality of magnets 510a and 520a and a plurality of driving coils 510b and 520b generating driving force to move a guide member in a direction perpendicular to the optical axis (the Z axis). The frame 310 and the lens holder 320 may be inserted into the carrier 300, be disposed in the optical axis (Z-axis) direction, and guide the movement of the lens barrel 210. The frame 310 and the lens holder 320 may have a space into which the lens barrel 210 may be inserted. The lens barrel 210 may be inserted and fixed into the lens holder 320.

The frame 310 and the lens holder 320 may be moved in a direction perpendicular to the optical axis (the Z-axis) for the carrier 300 by the driving force generated by the plurality of magnets 510a and 520a and the plurality of driving coils 510b and 520b. Among the magnets 510a and 520a and the driving coils 510b and 520b, magnet 510a and coil 510b may generate driving force in a first axis (Y-axis) direction perpendicular to the optical axis (the Z-axis), and magnet 520a and coil 520b may generate driving force in a second axis (X-axis) direction perpendicular to the first axis (a Y-axis). A second axis (an X axis) refers to an axis perpendicular to both of the optical axis (the Z axis) and the first axis (the Y axis). The plurality of magnets 510a and 520a may be disposed to be orthogonal to each other on a plane perpendicular to the optical axis (the Z axis).

The plurality of magnets 510a and 520a may be mounted on the lens holder 320, and the plurality of driving coils 510b and 520b facing the plurality of magnets 510a and 520a, respectively, may be disposed on the substrate 600 and be mounted on the housing 120.

The plurality of magnets 510a and 520a may be moved in a direction perpendicular to the optical axis (the Z axis) together with the lens holder 320, while the plurality of driving coils 510b and 520b may be fixed to the housing 120. However, positions of the plurality of magnets 510a and 520a and the plurality of driving coils 510b and 520b may be exchanged with each other.

A closed loop control manner of sensing and feeding back a position of the lens barrel 210 may be used in a hand-shake correction process. Therefore, the position calculating unit may provide closed loop control. The position calculating unit may detect the position of the lens barrel 210.

The camera module 100 may include a plurality of ball members supporting the hand-shake correction unit 500. The plurality of ball members may serve to guide movement of the frame 310, the lens holder 320, and the lens barrel 210 in the hand-shake correction process. The plurality of ball members may serve to maintain an interval between the carrier 300, the frame 310, and the lens holder 320.

The plurality of ball members may include first ball members B2 and second ball members B3. The first ball members B2 may guide movement of the frame 310, the lens holder 320, and the lens barrel 210 in the first axis (Y-axis) direction, and the second ball members B3 may guide movement of the lens holder 320 and the lens barrel 210 in the second axis (X-axis) direction.

As an example, the first ball members B2 may be moved in a rolling motion in the first axis (Y-axis) direction when driving force is generated in the first axis (Y-axis) direction. Therefore, the first ball members B2 may guide the movement of the frame 310, the lens holder 320, and the lens barrel 210 in the first axis (Y-axis) direction. The second ball members B3 may be moved in a rolling motion in the second axis (X-axis) direction when driving force is generated in the second axis (X-axis) direction. Therefore, the second ball members B3 may guide the movement of the lens holder 320 and the lens barrel 210 in the second axis (X-axis) direction.

The first ball members B2 may include a plurality of ball members disposed between the carrier 300 and the frame 310, and the second ball members B3 may include a plurality of ball members disposed between the frame 310 and the lens holder 320.

In surfaces of the carrier 300 and the frame 310 facing each other in the optical axis (Z-axis) direction, first guide groove portions 301 may be formed to accommodate the first ball members B2 therein. The first guide groove portions 301 may include a plurality of guide grooves corresponding to the plurality of ball members of the first ball members B2. The first ball members B2 may be accommodated in the first guide groove portions 301 and be fitted between the carrier 300 and the frame 310. Movement of the first ball members B2 may be restricted in the optical axis (Z-axis) direction and the second axis (X-axis) direction and the first ball members B2 may be moved in only the first axis (Y-axis) direction, in a state in which the first ball members B2 are accommodated in the first guide groove portions 301. As an example, the first ball members B2 may be moved in a rolling motion in only the first axis (Y-axis) direction. To this end, a planar shape of each of the plurality of guide grooves of the first guide groove portions 301 may be a rectangular shape having a length in the first axis (Y-axis) direction.

In surfaces of the frame 310 and the lens holder 320 facing each other in the optical axis (Z-axis) direction, second guide groove portions 311 may be formed to accommodate the second ball members B3 therein. The second guide groove portions 311 may include a plurality of guide grooves corresponding to the plurality of ball members of the second ball members B3.

The second ball members B3 may be accommodated in the second guide groove portions 311 and be fitted between the frame 310 and the lens holder 320. Movement of the second ball members B3 may be restricted in the optical axis (Z-axis) direction and the first axis (Y-axis) direction and the second ball members B3 may be moved in only the second axis (X-axis) direction, in a state in which the second ball members B3 are accommodated in the second guide groove portions 311. As an example, the second ball members B3 may be moved in a rolling motion in only the second axis (X-axis) direction. To this end, a planar shape of each of the plurality of guide grooves of the second guide groove portions 311 may be a rectangular shape having a length in the second axis (X-axis) direction.

Third ball members B4 supporting movement of the lens holder 320 may be provided between the carrier 300 and the lens holder 320. The third ball members B4 may guide both movement of the lens holder 320 in the first axis (Y-axis) direction and movement of the lens holder 320 in the second axis (X-axis) direction.

As an example, the third ball members B4 may be moved in a rolling motion in the first axis (Y-axis) direction when driving force in the first axis (Y-axis) direction is generated. Therefore, the third ball members B4 may guide the movement of the lens holder 320 in the first axis (Y-axis) direction. The third ball members B4 may be moved in a rolling motion in the second axis (X-axis) direction when driving force in the second axis (X-axis) direction is generated. Therefore, the third ball members B4 may guide the movement of the lens holder 320 in the second axis (X-axis) direction. The second ball members B3 and the third ball members B4 may be in contact with and support the lens holder 320.

In surfaces of the carrier 300 and the lens holder 320 facing each other in the optical axis (Z-axis) direction, third guide groove portions 302 may be formed to accommodate the third ball members B4 therein. The third ball members B4 may be accommodated in the third guide groove portions 302 to be inserted between the carrier 300 and the lens holder 320. While the third ball members B4 are accommodated in the third guide groove portions 302, movement of the third ball members B4 may be restricted in the optical axis (Z-axis) direction and the third ball members B4 may be moved in a rolling motion in the first axis (Y-axis) direction and the second axis (X-axis) direction. To this end, a planar shape of each of the third guide groove portions 302 may be a circular shape. Therefore, the third guide groove portions 302 may have a planar shape different from that of the first and second guide groove portions 301 and 311.

The first ball members B2 may be movable in the rolling motion in the first axis (Y-axis) direction, the second ball members B3 may be movable in the rolling motion in the second axis (X-axis) direction, and the third ball members B4 may be movable in the rolling motion in the first axis (Y-axis) direction and the second axis (X-axis) direction. Therefore, the plurality of ball members supporting the hand-shake correction unit 500 may have a difference in a degree of freedom. The degree of freedom refers to the number of independent variables required for representing a motion state of an object in a three-dimensional (3D)

coordinate system. Generally, in the 3D coordinate system, a degree of freedom of the object may be 6. Movement of the object may be represented by an orthogonal coordinate system having three directions and a rotary coordinate system having three directions. As an example, in the 3D coordinate system, the object may be moved in a translation motion along the respective axes (the X axis, the Y axis, and the Z axis), and may be moved in a rotation motion in relation to the respective axes (the X axis, the Y axis, and the Z axis).

The degree of freedom refers to the number of independent variables required for representing movement of the first ball members B2, the second ball members B3, and the third ball members B4 when the hand-shake correction unit 500 is moved by the driving force generated in the direction perpendicular to the optical axis (the Z axis) by applying electric power to the hand-shake correction unit 500. As an example, the third ball members B4 may be moved in the rolling motion along two axes (the first axis (the Y axis) and the second axis (the X axis)), and the first ball members B2 and the second ball members B3 may be moved in the rolling motion along one axis (the first axis (the Y axis) or the second axis (the X axis)), by the driving force generated in the direction perpendicular to the optical axis (the Z axis). Therefore, the degree of freedom of the third ball members B4 may be greater than the degree of freedom of the first ball members B2 and the second ball members B3.

When the driving force is generated in the first axis (Y-axis) direction, the frame 310, the lens holder 320, and the lens barrel 210 may be moved together in the first axis (Y-axis) direction. The first ball members B2 and the third ball members B4 may be moved in the rolling motion along the first axis (the Y-axis). In this case, the movement of the second ball members B3 may be restricted.

When the driving force is generated in the second axis (X-axis) direction, the lens holder 320 and the lens barrel 210 may be moved in the second axis (X-axis) direction. The second ball members B3 and the third ball members B4 may be moved in the rolling motion along the second axis (the X-axis). In this case, the movement of the first ball members B2 may be restricted.

A plurality of yokes 510c and 520c may be provided so that the hand-shake correction unit 500 and the first to third ball members B2, B3, and B4 remain in contact with each other. The plurality of yokes 510c and 520c may be fixed to the carrier 300, and may be disposed to face the plurality of magnets 510a and 520a, respectively, in the optical axis (Z-axis) direction. Therefore, attractive force may be generated in the optical axis (Z-axis) direction between the plurality of yokes 510c and 520c and the plurality of magnets 510a and 520a. Since the hand-shake correction unit 500 is pressed toward the plurality of yokes 510c and 520c by the attractive force between the plurality of yokes 510c and 520c and the plurality of magnets 510a and 520a, the frame 310 and the lens holder 320 of the hand-shake correction unit 500 may be maintained in a state in which they are in contact with the first to third ball members B2, B3, and B4. The plurality of yokes 510c and 520c may be formed of a material that may generate the attractive force between the plurality of yokes 510c and 520c and the plurality of magnets 510a and 520a. As an example, the plurality of yokes 510c and 520c may be formed of a magnetic material.

The plurality of yokes 510c and 520c may be provided so that the frame 310 and the lens holder 320 may be maintained in the state in which they are in contact with the first to third ball members B2, B3, and B4, and a stopper 330 may be provided in order to prevent the first to third ball members B2, B3, and B4, the frame 310, and the lens holder 320 from being externally separated from the carrier 300 due to external impact, or the like. The stopper 330 may be coupled to the carrier 300 to cover at least a portion of an upper surface of the lens holder 320.

Figure 3:
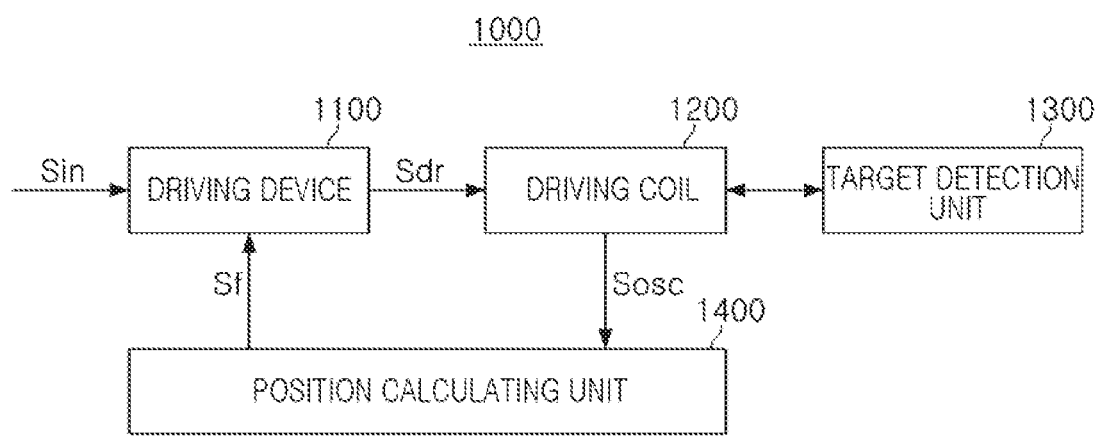
FIG. 3 is a block diagram illustrating an actuator used in a camera module according to an example.

FIG. 3 is a block diagram illustrating an actuator used in the camera module according to an example. An actuator 1000 of FIG. 3 may correspond to one of the focusing unit 400 and the hand-shake correction unit 500 in FIG. 2.

When the actuator 1000 in FIG. 3 corresponds to the focusing unit 400 in FIG. 2, the actuator 1000 may move the lens barrel in an optical axis direction to perform an autofocusing (AF) function of the camera module. Therefore, when the actuator 1000 in FIG. 3 performs the autofocusing function, a driving device 1100 may apply a driving signal to a driving coil 1200 to provide driving force in the optical axis direction to the lens barrel.

When the actuator 1000 in FIG. 3 corresponds to the hand-shake correction unit 500 in FIG. 2, the actuator 1000 may move the lens barrel in a direction perpendicular to the optical axis in order to perform an optical image stabilization (OIS) function of the camera module. Therefore, when the actuator 1000 of FIG. 3 performs the optical image stabilization function, the driving device 1100 may apply the driving signal to the driving coil 1200 to provide driving force in the directions perpendicular to the optical axis to the lens barrel.

The actuator 1000 may include the driving device 1100, the driving coil 1200, a target detection unit 1300, and a position calculating unit 1400.

The driving device 1100 may generate a driving signal Sdr depending on an input signal Sin, applied from an external source, and a feedback signal Sf, generated from the position calculating unit 1400, and may provide the generated driving signal Sdr to the driving coil 1200.

When the driving signal Sdr provided from the driving device 1100 is applied to the driving coil 1200, the lens barrel may move in the optical axis direction or a direction perpendicular to the optical axis by electromagnetic interaction between the driving coil 1200 and a magnet. As an example, the driving signal Sdr may be provided to the driving coil 1200 in one of current and voltage forms.

The position calculating unit 1400 may calculate a position of the target detection unit 1300 according to a frequency of an oscillation signal Sosc obtained from a driving coil. The position calculating unit 1400 may calculate displacement of the lens barrel through the calculation of the position of the target detection unit 1300.

A frequency of the oscillation signal Sosc obtained from the driving coil 1200 is variable depending on a position of the target detection unit 1300.

The target detection unit 1300 is formed of one of a magnetic material and a conductor and is disposed within a magnetic range. As an example, the target detection unit 1300 may be disposed to oppose the driving coil 1200. The target detection unit 1300 may be provided on one side of the lens barrel to move in the same direction as a moving direction of the lens barrel. According to some examples, the target detection unit 1300 may be provided on at least one of a carrier and a plurality of frames coupled to the lens barrel, in addition to the lens barrel.

The target detection unit 1300 may correspond to the magnet 410, 510a, or 520a (see FIG. 2) disposed to face the driving coil 1200. According to some examples, a separate component may be prepared to implement the target detection unit 1300.

When the target detection unit 1300 formed of one of a magnetic material and a conductor moves together with the lens barrel, inductance of the driving coil 1200 varies. For example, a frequency of the oscillation signal Sosc varies depending on the movement of the target detection unit 1300.

The position calculating unit 1400 may calculate a position of the target detection unit 1300 to generate a feedback signal Sf and to transmit the feedback signal Sf to the driving device 1100.

When the feedback signal Sf is provided to the driving device 1100, the driving device 1100 may regenerate a driving signal Sdr, compared with the input signal Sin and the feedback signal Sf. For example, the driving device 1100 may be driven in a closed loop type to compare the input signal Sin and the feedback signal Sf with each other. The driving device 1100 of the closed loop type may be driven in a direction to reduce an error between a target position of the target detection unit 1300 included in the input signal Sin and a current position of the magnet 1300 included in the feedback signal Sf. Compared with an open loop type driving, closed loop type driving results in advantages such as improvement in linearity, accuracy, and repeatability.

Figure 4:
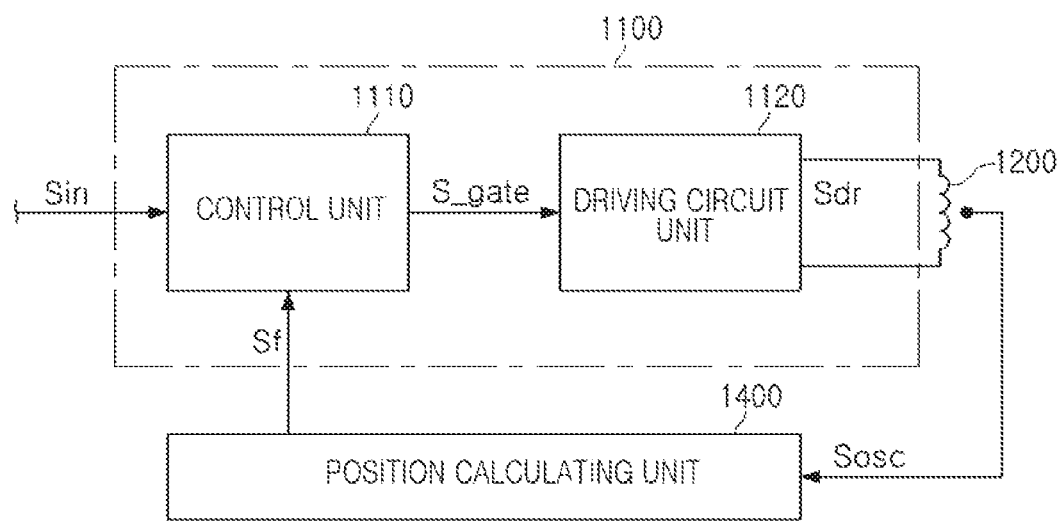
FIG. 4 is a block diagram illustrating main units of an actuator of FIG. 3 in more detail.

FIG. 4 is a block diagram illustrating main units of an actuator in FIG. 3 in more detail.

Referring to FIG. 4, the driving device 1100 may include a control unit 1110 and a driving circuit unit 1120. The driving device in FIG. 4 may be implemented by a driver integrated circuit (IC).

The control unit 1110 may generate a control signal S_gate from the input signal Sin and the feedback signal Sf provided from the position calculating unit 1400. The control unit 1110 may compare the input signal Sin indicating a target position of the lens barrel and the feedback signal Sf indicating a current position of the lens barrel with each other to generate the control signal S_gate.

The driving circuit unit 1120 may generate the driving signal Sdr depending on the control signal S_gate, and provide the driving signal to the driving coil 1200. The driving signal Sdr may be provided in one of current and voltage forms to both ends of the driving coil 1200. The lens barrel may move to the target position by the driving signal Sdr generated by the driving circuit unit 1120 and provided to the driving coil 1200.

The driving circuit unit 1120 may include an H bridge circuit bi-directionally driven by the control signal S_gate to apply the driving signal Sdr to the driving coil 1200. The H bridge circuit may include a plurality of transistors connected to both ends of the driving coil 1200 in an H bridge form. When the driving circuit unit 1120 is driven in a voice coil motor manner, the control signal S_gate provided from the controlling unit 1120 may be applied to gates of the transistors included in the H bridge circuit.

Figure 5:
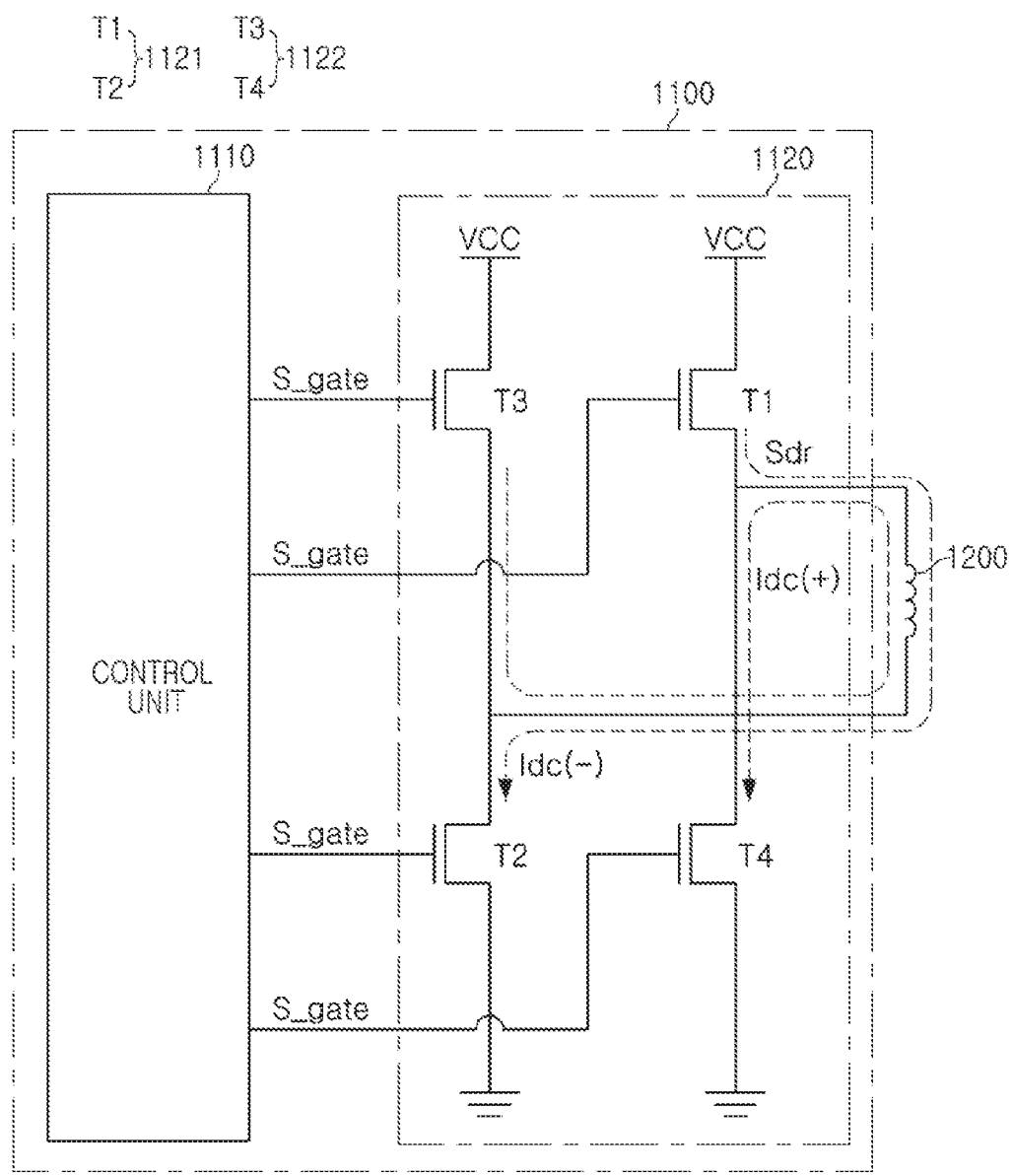
FIG. 5 is a circuit diagram illustrating a driving circuit unit of a driving device of FIG. 4 in detail.

FIG. 5 is a circuit diagram illustrating a driving circuit unit of a driving device in FIG. 4 in detail.

Referring to FIG. 5, the driving circuit unit 1120 may include a plurality of transistors T1, T2, T3, and T4 connected to the driving coil 1200 in an H bridge form. The driving circuit unit 1120 may include a first path transistor unit 1121 and a second path transistor unit 1122. A first path current Idc(−) flows due to the first path transistor unit 1121, and a second path current Idc(+) flows due to the second path transistor 1122.

The first path transistor unit 1121 may include a first transistor T1 and a second transistor T2. The first transistor T1 may be disposed between a driving power supply Vcc and one end of the driving coil 1200, and the second transistor T2 may be disposed between the other end of the driving coil 1200 and a ground.

The first path transistor unit 1121 may form a first path of the driving signal Sdr applied to the driving coil 1200 depending on the control signal S_gate provided from the control unit 1110. As an example, the control signal S_gate may be provided to gates of the first transistor T1 and the second transistor T2. As an example, when the control signal S_gate is in a high level, the first transistor T1 and the second transistor T2 may be turned on, and when the control signal S_gate is in a low level, the first transistor T1 and the second transistor T2 may be turned off. According to some examples, different control signals are provided to the first and second transistors T1 and T2 in such a manner that both the first and second transistors T1 and T2 are turned on, and one of the first and second transistors T1 and T2 adjusts the amount of current flowing through the first path.

The second path transistor unit 1122 may include a third transistor T3 and a fourth transistor T4. The third transistor T3 may be disposed between the driving power supply Vcc and the other end of the driving coil 1200, and the fourth transistor T4 may be disposed between one end of the driving coil 1200 and the ground.

The second path transistor unit 1122 may form a second path of the driving signal Sdr applied to the driving coil 1200 depending on the control signal S_gate provided from the control unit 1110. As an example, the control signal S_gate may be provided to gates of the third transistor T3 and the fourth transistor T4. As an example, when the control signal S_gate is in a high level, the third and fourth transistors T3 and T4 may be turned on, and when the control signal S_gate is in a low level, the third and fourth transistors T3 and T4 may be turned off. According to some examples, different control signals are provided to the third and fourth transistors T3 and T4 in such a manner that both the third and fourth transistors T3 and T4 are turned on, and one of the third and fourth transistors T3 and T4 adjusts the amount of current flowing through the second path.

The first path transistor unit 1121 and the second path transistor unit 1122 may form different paths of the driving signal Sdr applied to the driving coil 1200. As an example, an operation section of the first path transistor unit 1121 may be the same as a non-operation section of the second path transistor unit 1122, and a non-operation section of the first path transistor unit 1121 may be the same an operation section of the second path transistor unit 1122.

The operation sections refer to sections in which transistors of the first path transistor unit 1121 and the second path transistor unit 1122 are turned on, and the non-operation sections refer to sections which the transistors of the first path transistor unit 1121 and the second path transistor unit 1122 are turned off.

For example, the first path transistor unit 1121 and the second path transistor unit 1122 may be selectively operated depending on the control signal S_gate provided from the control unit 1110. In the operation section of the first path transistor unit 1121, the first transistor T1 and the second transistor T2 of the first path transistor unit 1121 may be turned on, and in the non-operation section of the second path transistor unit 1122, the third transistor T3 and the fourth transistor T4 of the second path transistor unit 1122 may be turned off. In the non-operation section of the first path transistor unit 1121, the first transistor T1 and the second transistor T2 of the first path transistor unit 1121 may be turned off, and in the operation section of the second path transistor unit 1122, the third transistor T3 and the fourth transistor T4 of the second path transistor unit 1122 may be turned on.

Figure 6:
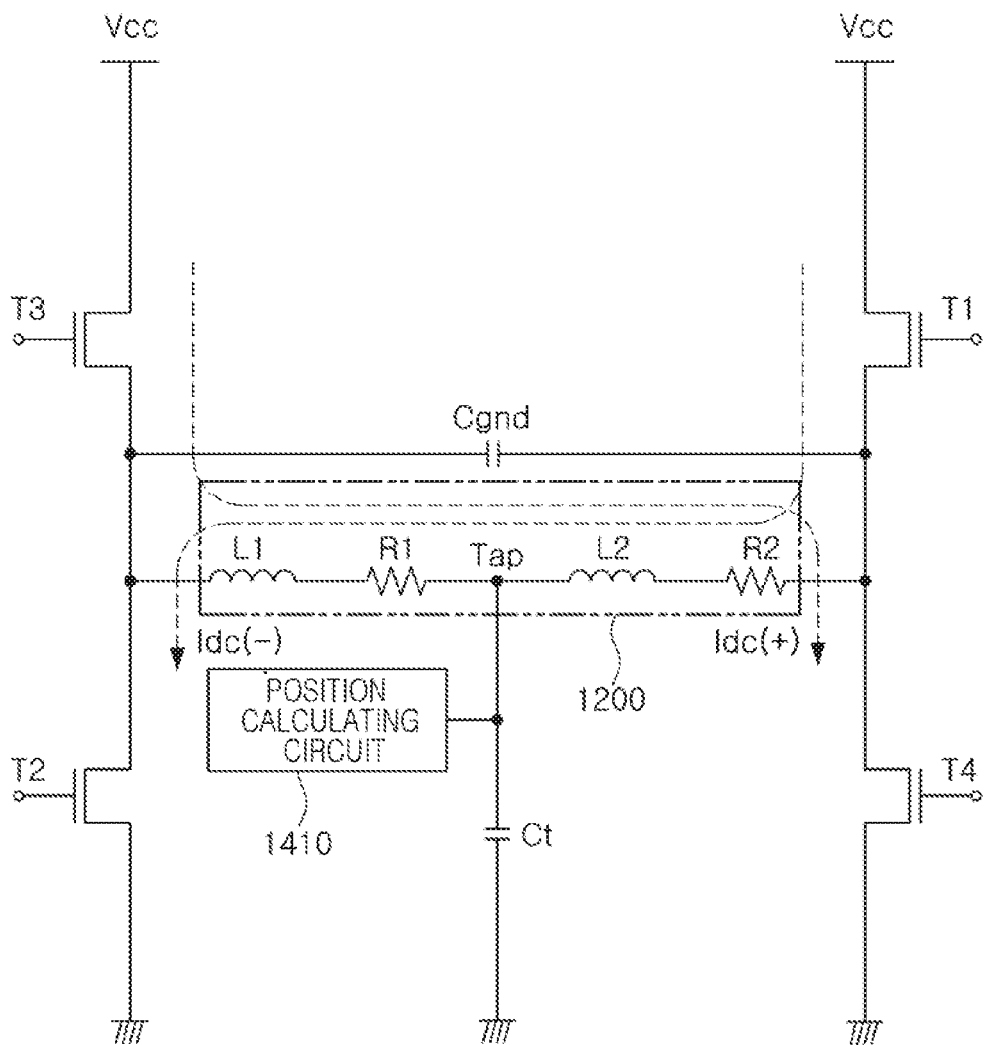
FIG. 6 is a circuit diagram illustrating a driving circuit unit and a position calculating unit according to an example.

FIG. 6 is a circuit diagram illustrating a driving circuit unit and a position calculating circuit unit according to an example. In FIG. 6, a driving coil 1200 is illustrated as an equivalent circuit including a first inductor L1, a second inductor L2, a first resistor R1, and a second resistor R2 connected in series. The first resistor R1 and the second resistor R2 may correspond to equivalent resistor components of the driving coil 1200 or parasitic resistor components of a branch in which the driving coil 1200 is disposed.

Referring to FIG. 6, a position calculating unit 1400 includes a first capacitor Cgnd disposed in parallel with the driving coil 1200, a second capacitor Ct disposed between a top terminal of the driving coil 1200 and a ground, and a position calculating circuit 1410 connected to a node between the tab terminal of the driving coil 1200 and the second capacitor Ct. The tab terminal of the driving coil 1200 may refer to one point of winding constituting the driving coil 1200.

Figure 7:
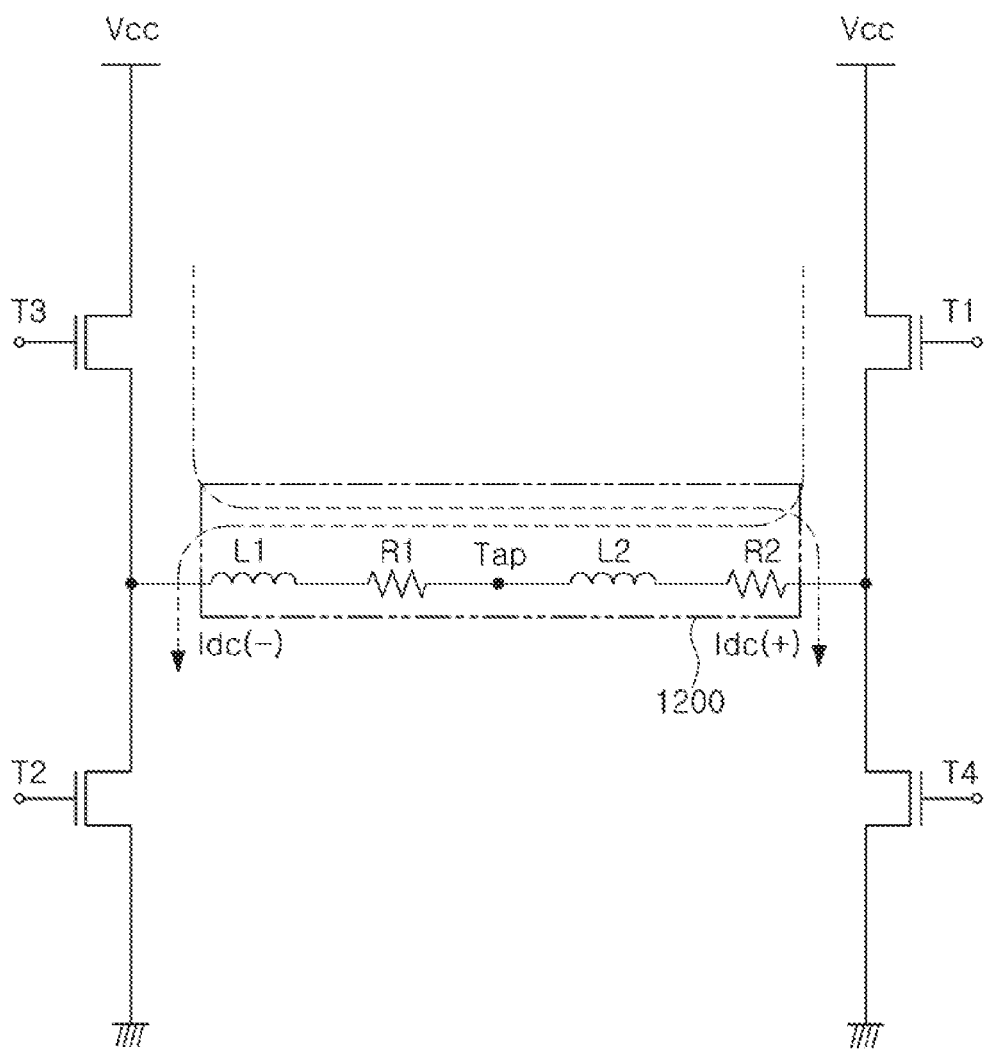
FIG. 7 illustrates an equivalent circuit of a circuit of FIG. 6 for a DC signal.

FIG. 7 illustrates an equivalent circuit of a circuit of FIG. 6 for a DC signal. The equivalent circuit of a circuit of FIG. 6 for a DC signal may be understood as an equivalent circuit of FIG. 6 in the case in which a DC signal is provided as a gate control signal driving transistors of a driving circuit unit.

A high-level DC signal is provided to a first transistor T1 and a second transistor T2 as a gate control signal, and a low-level DC signal is provided to a third transistor T3 and a fourth transistor T4 as a gate control signal. When a first path current Idc(−) flows due to the high-level DC signal and the low-level DC signal, the first transistor T1 may be turned on and the amount of the first path current Idc(−) may be determined depending on a voltage provided to a gate of the second transistor T2. A low-level DC signal is provided to the first transistor T1 and the second transistor T2 as a gate control signal, and a high-level DC signal is provided to the third transistor T3 and the fourth transistor T4 as a gate control signal. When a second path current Idc(+) flows due to the low-level signal and the high-level signal, the third transistor T3 may be turned on and the amount of the second path current Idc(+) may be determined depending on a voltage provided to a gate of the fourth transistor T4.

For the DC signal, a first capacitor Cgnd and a second capacitor Ct of a position calculating unit are equivalent to an open circuit. Accordingly, components of the position calculating unit may not affect an operation of the driving circuit unit 1120.

Figure 8:
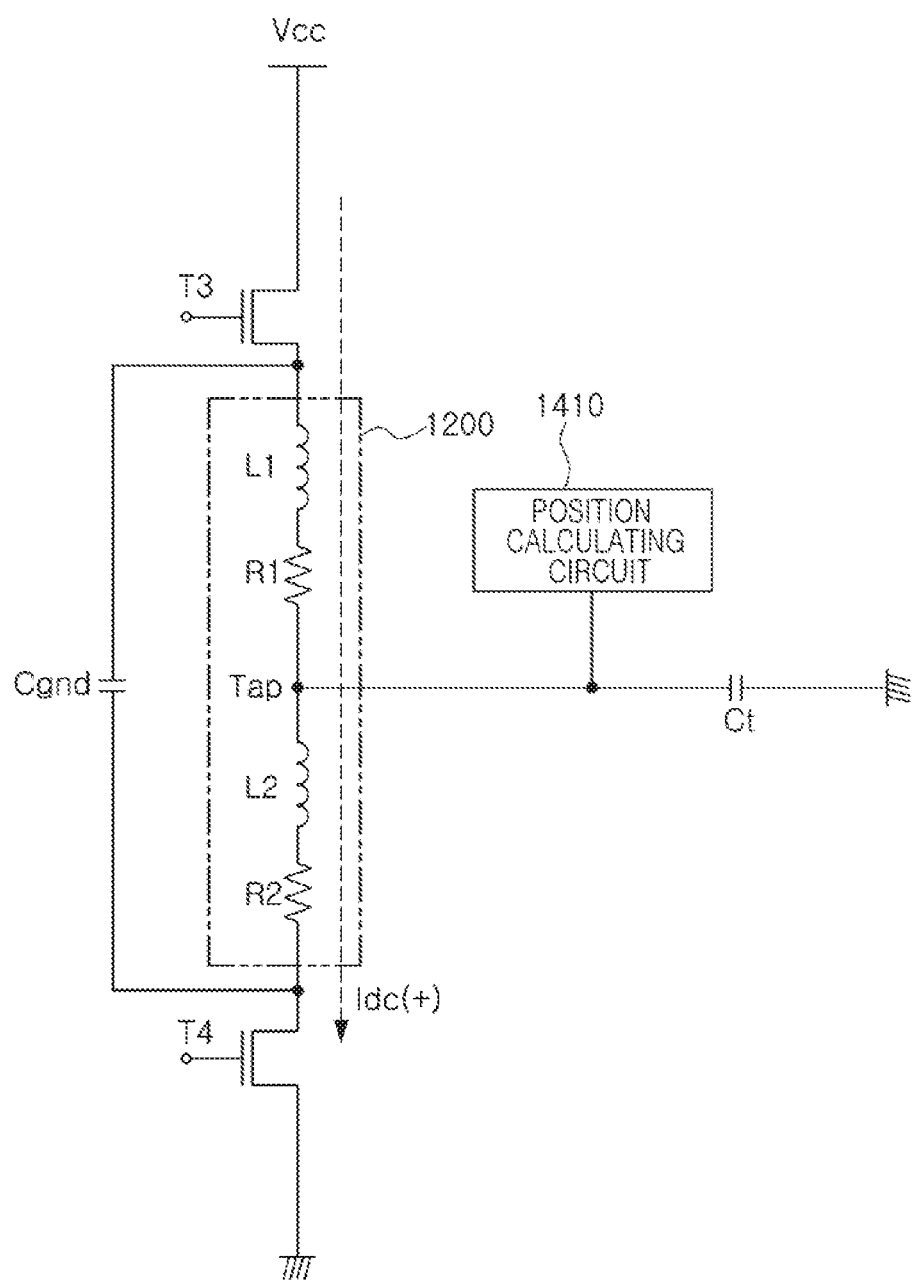
FIGS. 8, 9, and 10 illustrate equivalent circuits of a circuit of FIG. 6 for an AC signal.
Figure 9:
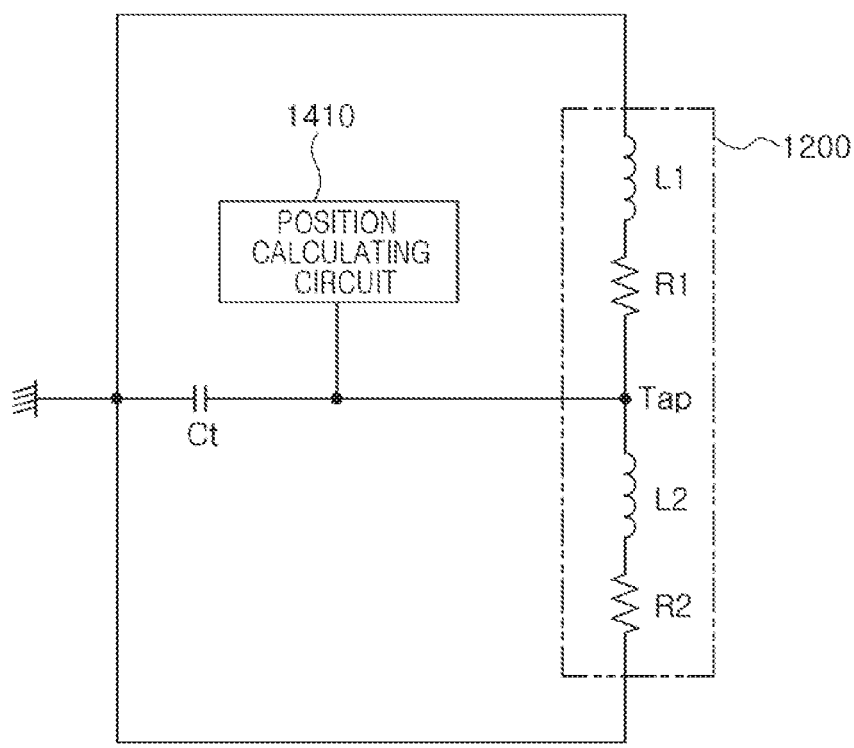
Figure 10:
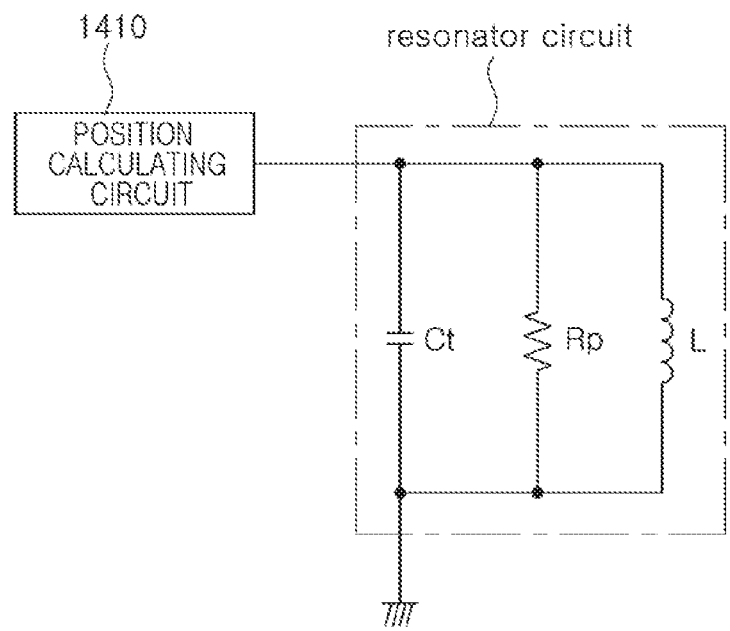

FIGS. 8, 9, and 10 illustrate equivalent circuits of a circuit of FIG. 5 for an AC signal. The AC signal will be understood as an oscillation signal output by an oscillation circuit to be described later. Therefore, the equivalent signal of a circuit of FIG. 6 for an AC signal will be understood as an equivalent circuit of FIG. 6.

To describe the equivalent circuit of FIG. 6 for an AC signal, it will be assumed that the first transistor T1 and the second transistor T2 are turned off. Under the assumption, the circuit of FIG. 6 may be equivalent to that of FIG. 8. In FIG. 8, the third transistor T3 may be turned on and the amount of the second path current Idc(+) may be determined according to a voltage provided to the gate of the fourth transistor T4. Thus, the second path current Idc(+) may flow to the driving coil 1200.

In this case, since the third transistor T3 has significantly low equivalent resistance when the third transistor T3 is turned on, the third transistor T3 is equivalent to a short-circuit. Thus, both terminals of the third transistor T3 are maintained in a ground state. For example, both terminals of the third transistor T3 may function as a ground AC GND for an AC signal.

On the other hand, the fourth transistor T4 is equivalent to an open circuit when the second path current Idc(+) is close to zero (0). The fourth transistor T4 is equivalent to a short circuit when the second path current Idc(+) is close to a maximum, and thus, both end terminals of the fourth transistor T4 are maintained in a ground state for the AC signal.

The first capacitor Cgnd connected to both ends of the driving coil 1200 is equivalent to a short circuit for the AC signal. Thus, the first capacitor Cgnd may provide a ground signal AC GND, for the AC signal, to both ends of the driving coil 1200 due to the AC signal. As a result, the circuit of FIG. 8 may be equivalent to the circuit of FIG. 9, irrespective of the amount of the second path current Idc(+). As illustrated in FIG. 8, the first capacitor Cgnd is connected in parallel to both ends of the driving coil 1200. However, it is a matter of course that two first capacitors Cgnd are provided, and one of the two capacitors Cgnd is connected between one end of the driving coil 1200 and a ground and the other capacitor Cgnd is connected between the other end of the driving coil 1200 and the ground.

On the basis of a tab terminal of the driving coil 1200, a first inductor L1 and a second inductor L2 of the driving coil 1200, connected in parallel, are equivalent to an inductor L(=(L1*L2)/(L1+L2)).

The capacitor Ct may be expressed as Equation (1) below. Referring to Table (1), the capacitor Ct may be expressed as a capacitor C1 viewed from the first inductor L1, a capacitor C2 viewed from the second inductor L2, and a parasitic capacitor CP.

$$Ct = C1 + C2 + Cp \qquad \text{Equation (1):}$$

On the basis of the tab terminal of the driving coil 1200, a first resistor R1 and the second resistor R2, connected in parallel, may be equivalent to a resistor Rp according to Equation (2) below.

$$Rp1 = \frac{1}{R1}\frac{L1}{C1},\ Rp2 = \frac{1}{R2}\frac{L2}{C2}, \qquad \text{Equation (2)}$$
$$Rp = Rp1 \mathbin{/\mkern-6mu/} Rp2:$$

Accordingly, a circuit of FIG. 9 may be equivalent to a circuit of FIG. 10. In this case, an oscillation frequency of an oscillation circuit including a capacitor Ct, a resistor Rp, and an inductor L is expressed as Equation (3). For ease of description, the capacitor Ct, the resistor Rp, and the inductor L, connected in parallel, will be hereinafter referred to as an oscillation circuit.

$$f = \frac{1}{2\pi\sqrt{L*Ct}}: \qquad \text{Equation (3)}$$

Figure 11:
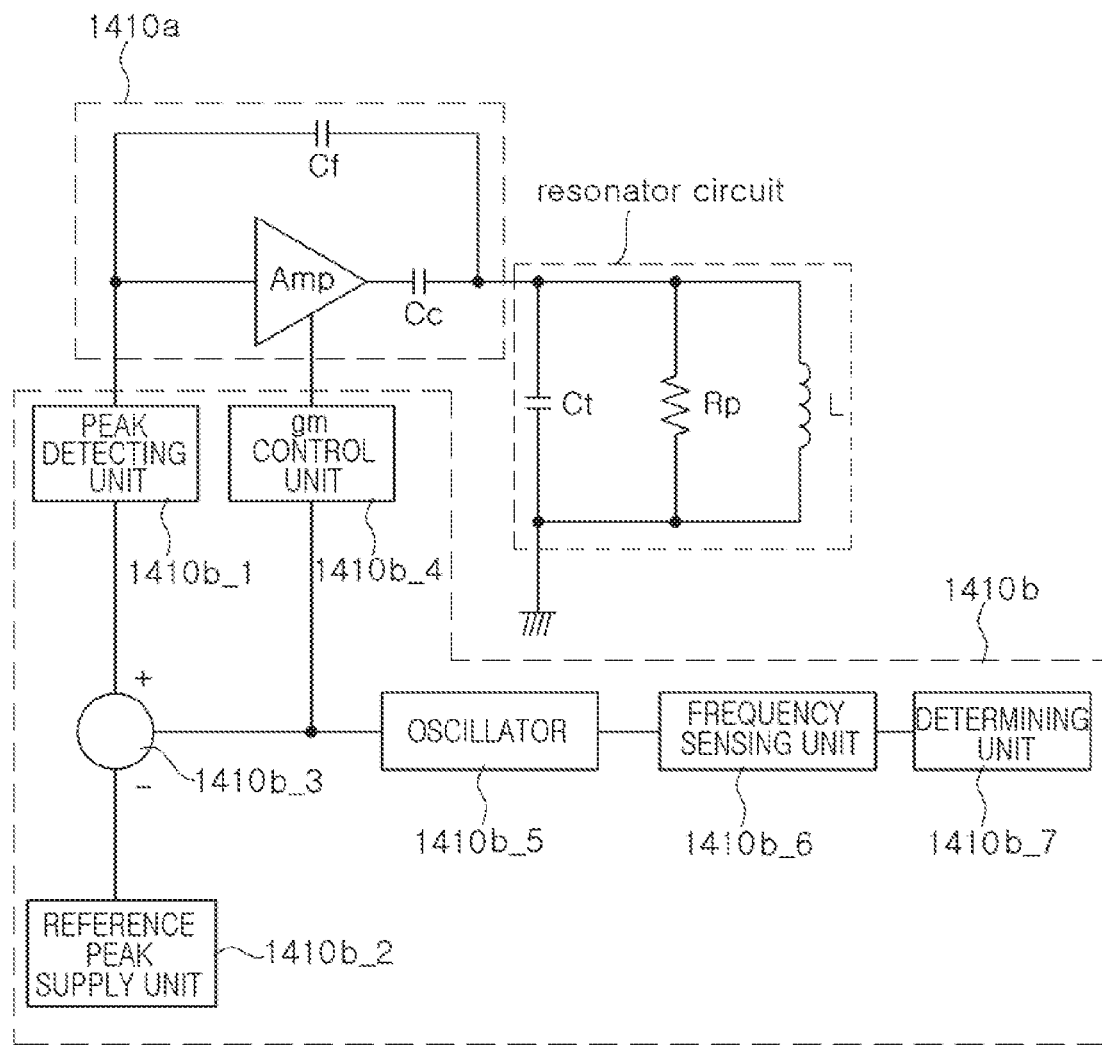
FIG. 11 is a block diagram illustrating a position calculating circuit according to an example.

As illustrated in FIG. 11, the position calculating circuit 1410 may include an oscillation maintaining unit 1410a and a frequency sensing unit 1410b.

The oscillation maintaining unit 1410a may include an amplifier Amp, a capacitor Cf, and a capacitor Cc. One end of the capacitor Cc is connected to an output terminal of the amplifier Amp, and the capacitor Cf is connected between the other end of the capacitor Cc and the output terminal of the amplifier Amp.

The oscillation maintaining unit 1410*a* compensates for energy loss, caused by a resistor Rp, to maintain oscillation, in detail LC oscillation, occurring due to the inductor L and the capacitor Ct of the oscillation circuit. In this case, a transconductance gain gm of the amplifier Amp for maintaining oscillation satisfies Equation 4 below.

$$gm24\ 1/Rp \qquad \text{Equation (4):}$$

When a distance between the target detection unit 1300 and the inductor L is changed in the state in which oscillation is maintained, inductance of the inductor L varies and a frequency of an oscillation signal output by an oscillation circuit also varies. In this case, the oscillation of the oscillation circuit may occur in the tab terminal of the driving coil 1200 even when a current flows in any one direction of the first path current Idc(−) and the second path current Idc(+).

Accordingly, the position calculating unit 1400 may calculate a position of a lens barrel according to a frequency variation of the oscillation signal depending on the variation of the inductance of the driving coil.

The oscillation signal output by the oscillation circuit may be input to the amplifier Amp through the capacitor Cf, and the amplifier Amp may amplify the input oscillation signal and may output the amplified oscillation signal through the capacitor Cc to maintain the oscillation of the oscillation circuit. The amplified oscillation signal may be input to the frequency sensing unit 1410*b*, and the frequency sensing unit 1410*b* may obtain frequency information of the oscillation signal.

The frequency sensing unit 1410*b* may include a peak detecting unit 1410*b*_1, a reference peak supply unit 1410*b*_2, a comparing unit 1410*b*_3, a gain (gm) control unit 1410*b*_4, an oscillator 1410*b*_5, a frequency sensing unit 1410*b*_6, and a determining unit 1410*b*_7.

The peak detecting unit 1410*b*_1 may detect a peak of an oscillation signal output by an oscillation circuit. As an example, the peak detecting unit 1410*b*_1 may detect a peak of the oscillation signal from an amplitude of the oscillation signal.

The comparing unit 1410*b*_3 may compare the peak of the oscillation signal detected by the peak detecting unit 1410*b*_1 with a reference peak provided by the reference peak supply unit 1410*b*_2. For example, the comparing unit 1410*b*_3 may output a comparison result by subtracting the amplitude of the peak of the oscillation signal from an amplitude of the reference peak. The comparing unit 1410*b*_3 may output a comparison result of the peak of the oscillation signal and the reference peak in the form of a voltage.

The gain control unit 1410*b*_4 may control a gain gm of an amplifier Amp according to the comparison result of the peak of the oscillation signal output by the comparing unit 1410*b*_3 and the reference peak. The gain control unit 1410*b*_4 may control the gain gm of the amplifier Amp in such a manner that the peak of the oscillation signal is maintained at a predetermined level. As an example, the gain control unit 1410*b*_4 may control the gain gm of the amplifier Amp in such a manner that the peak of the oscillation signal follows the reference peak.

The oscillator 1410*b*_5 may output an AC signal in accordance with the comparison result of the peak of the oscillation signal and the reference peak. As an example, the oscillator 1410*b*_5 may be implemented as a voltage controlled oscillator (VCO), configured to generate an AC signal, according to the comparison result of the reference peak and a peak of the oscillation signal provided in the form of voltage.

The frequency sensing unit 1410*b*_6 may calculate the frequency of the AC signal output by the oscillator 1410*b*_5. The frequency sensing unit 1410*b*_6 may count the AC signal using a reference clock signal CLK to calculate a frequency of the AC signal by. The reference clock signal CLK is a clock signal having a significantly high frequency. In the case in which, for example, the AC signal of one cycle is counted as the reference clock signal CLK during a reference period, a counting value of the signal CLK may be calculated. The frequency sensing unit 1410*b*_6 may calculate a frequency of the AC signal using the counting value of the reference clock signal CLK and the frequency of the reference clock signal CLK.

The determining unit 1410*b*_7 may receive the frequency of the AC signal from the frequency sensing unit 1410*b*_6 and may determine a position of the target detection unit 1300 according to the frequency of the AC signal. The determining unit 1410*b*_7 may include a memory, and the memory may store position information of the target detection unit 1300 corresponding to the frequency of the AC signal. The memory may be implemented using a nonvolatile memory including one of a flash memory, an electrically erasable programmable read-only memory (EEPROM), and a ferroelectric RAM (FeRAM). Accordingly, when the frequency of the AC signal is transmitted, the determining unit 1410*b*_7 may determine the position of the target detection unit 1300 with reference to the position information of the target detection unit 1300 stored in the memory.

Figure 12:
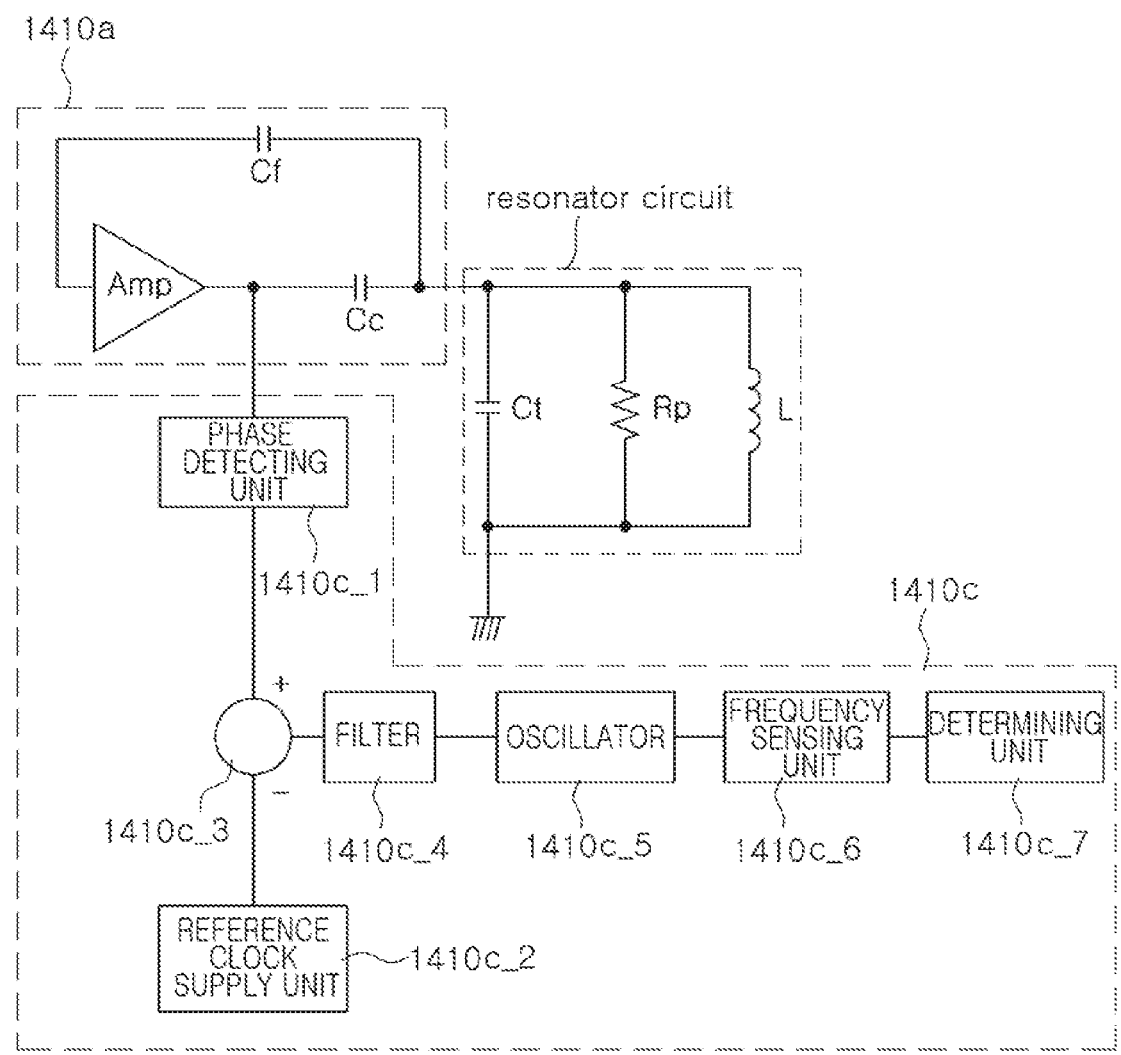
FIG. 12 is a block diagram illustrating a position calculating circuit according to an example.

FIG. 12 is a block diagram illustrating a position calculating circuit according to an example. Since the position calculating circuit illustrated in FIG. 12 is similar to the position calculating circuit illustrated in FIG. 11, duplication explanations will be omitted, while differences therebetween will be described in detail.

A position calculating circuit 1410 may include an oscillation maintaining unit 1410*a* and a frequency detecting unit 1410*c*.

The frequency detecting unit 1410*c* includes a phase detecting unit 1410*c*_1, a reference clock supply unit 1410*c*_2, a comparing unit 1410*c*_3, a filter 1410*c*_4, an oscillator 1410*c*_5, a frequency sensing unit 1410*c*_6, and a determining unit 1410*c*_7.

The phase detecting unit 1410*c*_1 may detect a phase of an oscillation signal output by an oscillation circuit. As an example, the phase detecting unit 1410*c*_1 may detect the phase of the oscillation signal and output a pulse signal corresponding to the phase of the oscillation signal.

The comparing unit 1410*c*_3 may compare the pulse signal output by the phase detecting unit 1410*c*_1 with a reference clock provided from the reference clock supply unit 1410*c*_2. As an example, the comparing unit 1410*c*_3 may compare a phase of the pulse signal with a phase of the reference clock to output a phase difference signal. The comparator 1410*c*_3 may output the phase difference signal in the form of a voltage.

The phase difference signal output by the comparing unit 1410*c*_3 may be provided to the oscillator 1410*c*_5 through the filter 1410*c*_4. As an example, the filter 1410*c*_4 may include a low pass filter.

The oscillator 1410*c*_5 may pass through the filter 1410*c*_4 to output an AC signal according to the provided phase difference signal. As an example, the oscillator 1410*c*_5 may be implemented as a voltage controlled oscillator (VCO) configured to generate an alternating current (AC) signal according to the phase difference signal provided in the form of voltage.

The frequency sensing unit 1410c_6 may calculate the frequency of the AC signal output by the oscillator 1410c_5. The frequency sensing unit 1410c_6 may count the AC signal using the reference clock signal CLK to calculate the frequency of the AC signal. The reference clock signal CLK is a clock signal having a significantly high frequency. In the case in which, for example, the AC signal of one cycle is counted as the reference clock signal CLK during a reference period, a counting value of the signal CLK may be calculated. The frequency detecting unit 1410c may calculate a frequency of the AC signal using the counting value of the reference clock signal CLK and the frequency of the reference clock signal CLK.

The determining unit 1410c_7 may receive the frequency of the AC signal from the frequency sensing unit 1410b_6 and may determine a position of the target detection unit 1300 according to the frequency of the AC signal. The determining unit 1410c_7 may include a memory, and the memory may store position information of the target detection unit 1300 corresponding to the frequency of the AC signal. The memory may be implemented using a nonvolatile memory including one of a flash memory, an electrically erasable programmable read-only memory (EEPROM), and a ferroelectric RAM (FeRAM). Accordingly, when the frequency of the AC signal is transmitted, the determining unit 1410c_7 may determine the position of the target detection unit 1300 with reference to the position information of the target detection unit 1300 stored in the memory.

An actuator of a camera module may precisely detect a position of a lens barrel from a variation in inductance of a driving coil. Furthermore, since the actuator does not employ a separate hole sensor, manufacturing cost of the actuator of the camera module may be reduced and space efficiency may be improved.

As described above, since an actuator of a camera module does not employ a separate hole sensor, manufacturing cost of the actuator of the camera module may be reduced and space efficiency may be improved.

The control unit 1110 and the position calculating unit 1400 in FIG. 4, for example, that perform the operations described in this application may be implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens barrel;
   a driving coil disposed to face a target detection unit disposed on one side of the lens barrel;
   a driving device configured to provide a driving signal to the driving coil; and
   a position calculating unit comprising a capacitor, constituting an oscillation circuit together with the driving coil, and configured to calculate a position of the lens barrel from an oscillation signal output by the oscillation circuit,
   wherein the position calculating unit is configured to generate an alternating current (AC) signal according to a comparison result of a peak of the oscillation signal and a reference peak and to calculate a position of the lens barrel according to a frequency of the AC signal, wherein the position calculating unit comprises an oscillation maintaining unit configured to amplify the oscillation signal to maintain oscillation of the oscillation circuit, and wherein the position calculating unit comprises a gain control unit configured to control an amplification gain of the oscillation maintaining unit based on the comparison result.

2. The camera module of claim 1, wherein the position calculating unit comprises:
   a peak detecting unit configured to detect the peak of the oscillation signal; and
   a comparing unit configured to compare the peak of the oscillation signal with the reference peak.

3. The camera module of claim 2, wherein the position calculating unit comprises an oscillator configured to output the AC signal according to a comparison result of the comparing unit.

4. The camera module of claim 3, wherein the oscillator comprises a voltage controlled oscillator configured to generate the AC signal according to the comparison result provided in the form of a voltage.

5. The camera module of claim 1, wherein the gain control unit is configured to control the amplification gain of the oscillation maintaining unit such that the peak of the oscillation signal is maintained at a predetermined level.

6. The camera module of claim 5, wherein the gain control unit is configured to control the amplification gain of the oscillation maintaining unit such that the peak of the oscillation signal follows the reference peak.

7. The camera module of claim 1, wherein the capacitor, constituting the oscillation circuit together with driving coil, is disposed between a tab terminal of the driving coil and a ground.

8. The camera module of claim 1, wherein the position calculating unit comprises another capacitor configured to provide a ground for the AC signal to the driving coil.

9. A camera module comprising:
   a lens barrel;
   a driving coil disposed to face a target detection unit disposed on one side of the lens barrel;
   a driving device configured to provide a driving signal to the driving coil; and
   a position calculating unit comprising a capacitor, constituting an oscillation circuit together with the driving coil, and configured to calculate a position of the lens barrel from an oscillation signal output by the oscillation circuit,
   wherein the position calculating unit is configured to compare a phase of the oscillation signal with a phase of a reference clock to generate an alternating current (AC) signal and to calculate a position of the lens barrel according to a frequency of the AC signal.

10. The camera module of claim 9, wherein the position calculating unit comprises:
    a phase detecting unit configured to detect the phase of the oscillation signal to output a pulse signal corresponding to the phase of the oscillation signal; and
    a comparing unit configured to compare the pulse signal with the reference clock.

11. The camera module of claim 10, wherein the position calculating unit is configured to output the AC signal according to a phase difference signal output by the comparing unit.

12. The camera module of claim 11, wherein the oscillator comprises a voltage controlled oscillator configured to generate the AC signal according to the phase difference signal provided in the form of a voltage.

13. The camera module of claim 9, wherein the capacitor, constituting the oscillation circuit together with the driving coil, is disposed between a tab terminal of the driving coil and a ground.

14. The camera module of claim 9, wherein the position calculation unit comprises a capacitor configured to provide a ground for the AC signal to the driving coil.

15. The camera module of claim 9, wherein the driving device is configured to generate the driving signal based on an input signal applied from an external source and a feedback signal generated from the position calculating unit.

16. The camera module of claim 9, wherein the driving coil comprises at least one first driving coil configured to generate a force to drive the lens barrel in first direction perpendicular to an optical axis direction and at least one second driving coil configured to generate a force to drive the lens barrel in second direction perpendicular to the optical axis direction.

* * * * *